United States Patent [19]
Eriksson

[11] Patent Number: 4,566,569
[45] Date of Patent: Jan. 28, 1986

[54] SYNCHRONIZING MECHANISM IN A VEHICLE GEARBOX

[75] Inventor: Leif K. S. Eriksson, Stockholm, Sweden

[73] Assignee: Saab-Scania Aktiebolag, Sodertalje, Sweden

[21] Appl. No.: 598,302

[22] PCT Filed: Jun. 20, 1983

[86] PCT No.: PCT/SE83/00257
§ 371 Date: Mar. 5, 1984
§ 102(e) Date: Mar. 5, 1984

[87] PCT Pub. No.: WO84/00405
PCT Pub. Date: Feb. 2, 1984

[30] Foreign Application Priority Data
Jul. 13, 1982 [SE] Sweden .................. 8204297

[51] Int. Cl.⁴ .................................. F16D 11/00
[52] U.S. Cl. .......................... 192/53 G; 74/339
[58] Field of Search ............. 74/339; 192/53 F, 53 G

[56] References Cited

U.S. PATENT DOCUMENTS

| | | | |
|---|---|---|---|
| 2,478,355 | 8/1949 | Auten | 192/53 F |
| 4,349,090 | 9/1982 | Griesser | 192/53 G |
| 4,425,990 | 1/1984 | Griesser | 74/339 |

FOREIGN PATENT DOCUMENTS

2324860 12/1973 Fed. Rep. of Germany .
2915965 10/1980 Fed. Rep. of Germany .
165923  1/1959 Sweden .

Primary Examiner—Stephen F. Husar
Attorney, Agent, or Firm—Cushman, Darby & Cushman

[57] ABSTRACT

Synchronizing mechanism in a gearbox, preferably a vehicle gearbox, including a synchronizing muff (14) non-rotatably connected to a shaft (1) and coacting with an engagement sleeve (36) surrounding the muff (14), the sleeve being axially displaceable for meshing with teeth (11) on a first synchronizing ring rotatably mounted on the shaft (1), the ring being non-rotatably joined to a gear (6) and formed with a conical friction surface (12) for coaction with a complementary conical friction surface (22) on a second synchronizing ring (21) for synchronizing the rotation of the gear (6) and shaft (1), the periphery of the synchronizing muff (14) being formed with a number of radial recesses (17) in which radial locating abutments (23) on the second synchronizing ring (21) engage. The invention is distinguished in that each locating abutment (23) is formed with a radial hole (24) in which a detent body (25) is displaceably mounted and adapted for being brought by spring means (31,32) into coaction with an interior annular groove (37) in the engagement sleeve (36), the second synchronizing ring (21) being axially centered relative the synchronizing muff (14) by the detent bodies (25) and the spring means (31, 32). The second synchronizing ring is located by the detent bodies (25) and does not require any further fixing, which substantially simplifies the mechanism and decreases the space requirement.

6 Claims, 2 Drawing Figures

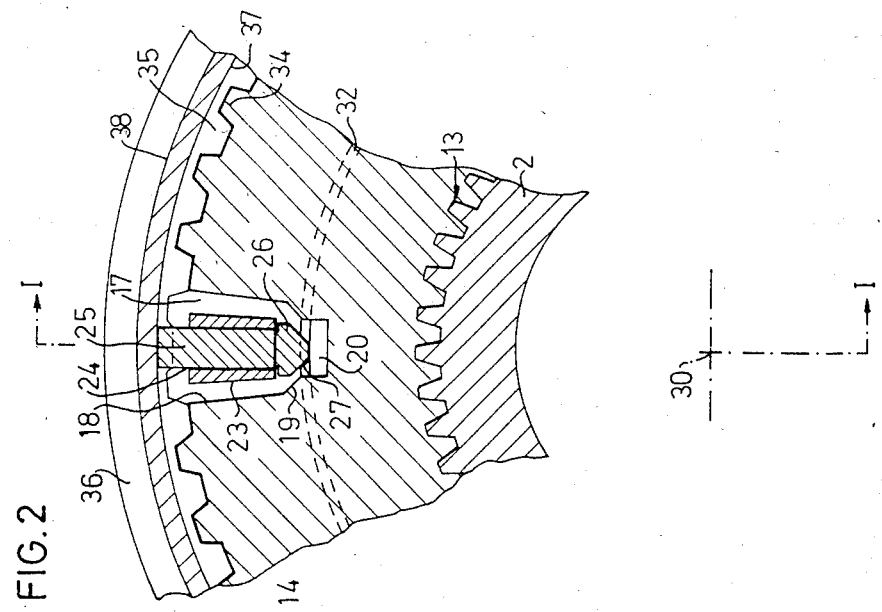
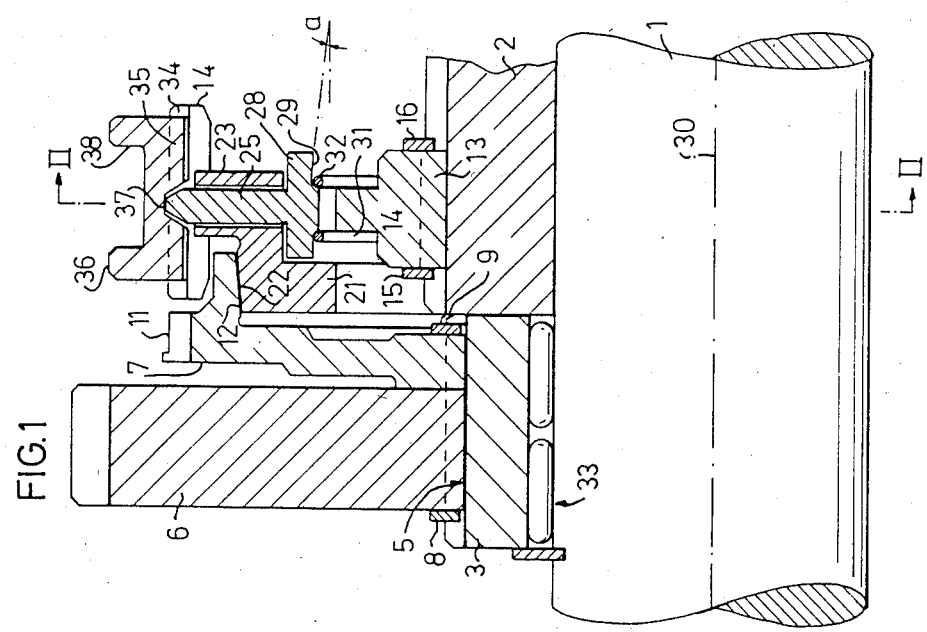

SYNCHRONIZING MECHANISM IN A VEHICLE GEARBOX

The present invention relates to a synchronizing mechanism in a gearbox, preferably a vehicle gearbox, including a synchronizing muff rotationally fixed to a shaft and having external engagement teeth coacting with internal engagement teeth on an engagement sleeve surrounding the synchronizing muff, this sleeve being axially displaceable for engaging engagement teeth on a first synchronizing ring rotatably mounted on the shaft and unrotatably joined to a gear and formed with a conical friction surface for coaction with a complementary conical friction surface on a second synchronizing ring for synchronizing the rotation of the gear and the shaft.

For the purpose of facilitating the engagement of different gears in a gearbox it is usual to arrange synchronizing mechanisms ensuring during a gear-changing operation that the gears, which are to be engaged, are given the same rotational velocity before engagement takes place. Such synchronizing mechanisms may be implemented in different ways, but usually the elements which are to be coupled together are each provided with a conical friction surface, and by axial displacement of at least one of the elements the friction surfaces are brought into gliding and engagement against each other such that the elements assume the same rotational velocity. In order that the synchronization shall take place smoothly and rapidly it is desirable that the friction surfaces are made as large as possible and at a large radial distance from the center of rotation. To enable production of a comparatively small gearbox it is however also desirable to implement the synchronizing mechanism with small dimensions. These two contrasting desires have led to known synchronizing mechanisms often being compromise solutions.

The present invention relates to a synchronizing mechanism which meets the mentioned basic requirements with respect to the size of the friction surfaces and their radial distance from the center of rotation while at the same time the implementation of the synchronizing mechanism only requires comparatively small dimensions in axial extension.

In the inventive embodiment, a synchronizing muff is unrotatably joined to a shaft and with engagement teeth coacts with an engagement sleeve surrounding the synchronizing muff, the sleeve being axially displaceable for engaging engagement teeth on a first synchronizing ring rotatably mounted on the shaft. This ring is non-rotatably joined to a gear and is formed with a conical friction surface for coaction with a complementary conical friction surface on a second synchronizing ring, the periphery of the synchronizing muff being formed with a number of radial recesses in which radial locating abutments on the other synchronizing ring engage. The invention is thereby mainly characterized in that each abutment is formed with a radial hole in which a detent body is displaceably mounted and adapted for being brought by spring means into coaction with an interior annular groove in the engagement sleeve, the second synchronizing ring being axially centered relative the synchronizing muff by the detent bodies and the spring means.

Since the second synchronizing ring is located by the detent bodies it does not require any further attachment, which substantially simplifies the mechanism and reduces space requirements.

In an advantageous embodiment, the synchronizing muff is axially fixed relative to the shaft, and as a result of the engagement of the detent bodies in the interior groove of the coupling sleeve during a synchronizing operation it is only the second synchronizing ring which is given axial displacement to and from the engagement position with the first synchronizing ring. Disengagement of the detent bodies from the interior groove in the engagement sleeve can only take place when the members intended to be synchronized assume the same rotational velocity. The inventive implementation means that necessary force for operating the synchronizing mechanism will be comparatively small.

Further distinguishing features of the invention are apparent from the following description of an embodiment exemplifying the invention. The description will now be carried out with reference to the accompanying drawings, of which FIG. 1 is an axial longitudinal section I—I of an inventive synchronizing mechanism in a vehicle gearbox, and FIG. 2 is an axial cross section II—II of the mechanism illustrated in FIG. 1.

In the embodiment illustrated in FIG. 1, a gear hub 3 is rotatably mounted on a shaft 1 with the aid of a needle bearing 33, the gear hub being axially fixed to the shaft 1 with the aid of a locking ring 4. With the aid of splines 5, the hub 3 is non-rotatably connected to a gear 6 and an outer synchronizing ring 7. These contact each other axially and are axially fixed in position on the hub 3 by two locking rings 8,9. The gear 6 is conventionally disposed for coaction with other gears (not shown) in the gearbox to form different gear ratios. The outer synchronizing ring 7 is formed with exterior engagement teeth 11 and on its side facing away from the gear 6 it is formed with an interior conical friction surface 12.

A synchronizing hub 2 is conventional attached to the shaft 1, and this hub is mountably connected with the aid of splines 13 to a synchronizing muff 14 surrounding the hub 2. The muff 14 is axially fixed between two locking rings 15,16 on the synchronizing hub 2. The synchronizing muff 14 is provided in its periphery with four radial recesses 17 at uniform angular spacing. One such recess 17 is illustrated in FIG. 2, from which it will be seen that the recesses 17 are open radially outwards and with purely radial side surfaces 18 merge radially inwards into two inwardly sloping surfaces 19 to a somewhat narrower bottom recess 20.

An inner synchronizing ring 21 is arranged between the synchronizing muff 14 and the outer synchronising ring 7 in an axial direction. This ring is formed with an exterior conical friction surface 22 intended for coaction with the friction surface 12 on the outer synchronizing ring 7. The inner synchronizing ring 21 is formed with four axial locating abutments 23, which axially thrust into the respective recess 17 in the synchronizing muff 14. The abutments 23 have a radial extension and are provided with radial holes 24. A detent body 25 is displaceably mounted in each of these holes 24.

Each detent body 25 is radially inwardly formed with a bottom plate 26 fitting into the respective bottom recess 20. This plate 26 is formed with sloping side surfaces 27 having substantially the same slope as the inner sloping faces 19 of the recesses 17. Axially, the bottom plates 26 are formed with straight sides and constitute spring seatings 28 extending axially outside the recess 17 on either side of the synchronizing muff 14. Radially inwards these spring seatings 28 are formed with weakly inwardly sloping engagement surfaces 29, the slope a being preferably about 5° relative a centerline 30 of the shaft 1. The slope a is directed such that the radii of the engagement surfaces 29 decrease with increased axial distance from the recess 17. Two annular springs 31,32, one on either side of the synchronizing muff 14 and both being common to all the detent bodies 25, engage against the engagement surfaces 29 of the spring seatings 28.

The annular springs 31,32 act on the detent bodies 25 with radially outwardly directed forces. Above the bottom plates 26, the detent bodies 25 are substantially cylindrical, but their radially outward parts are bevelled in an axial direction for coaction with an engagement sleeve 36.

The synchronizing muff 14 is formed with exterior axial engagement teeth 34 for meshing with internal engagement teeth 35 on the engagement sleeve 36 surrounding the synchronizing muff 14. In an axially central position, the engagement sleeve 36 is provided with an interior annular groove 37 having a cross section shaped like a trapezium with two parallel sides. The outer portions of the detent bodies 25 are adapted for engagement in this groove 27 when the engagement sleeve 36 assumes a disengaged position corresponding to that in FIG. 1. The engagement sleeve 36 is outwardly formed with an annular groove 38 for coaction with an unillustrated gear-change fork conventionally displacing the engagement sleeve 36 axially.

As previously mentioned, FIG. 1 illustrates the synchronizing mechanism in a disengaged condition. It is here assumed that the shaft 1 and the synchronizing muff 14 rigidly connected to it rotate at a given high speed, while the gear 6 and the outer synchronizing ring 7 rigidly attached to it are assumed to rotate at a low speed. An engagement sequence is initiated by the engagement sleeve 36 being moved towards the gear 6, i.e. to the left in FIG. 1. With the aid of its internal groove 37 the engagement sleeve 36 will thus cause the detent bodies 25 to accompany it and displace them, thereby also the inner synchronizing ring 21 until the latter is pressed into engagement against the outer synchronizing ring 7. Since the synchronizing rings 7 and 21 rotate at different velocities, sliding will occur between the friction surfaces 12 and 22, which successively evens out the difference in velocity present. During the evening-out phase, a relative angular motion between the inner synchronizing ring 7 and the synchronizing muff 14 is obtained, resulting in that the locating abutments 23 of the inner synchronizing ring 21 are urged against the side surfaces 18 of the recesses 17.

The engagement sleeve 36 is here prevented from being displaced further by the detent bodies 25 engaging against the side surfaces 18 of the recesses 17 and the inwardly sloping edge surfaces 19 in the synchronizing muff 14, thereby preventing the detent bodies 25 from being displaced into the bottom recesses 20 of the recesses 17. Only when the velocities of the synchronizing rings 7,21 have been evened-out is it possible to urge with normal force the detent bodies 25 into the bottom recesses 20, and thereby disengage the engagement sleeve 36. This may then be further displaced axially so that its engagement teeth 35 can be meshed with the engagement teeth 11 on the outer synchronizing ring 7, while meshing with the engagement teeth 34 of the synchronizing muff 14 is retained. In this condition the gear 6 is thus non-rotatably engaged with the shaft 1.

At the same time as the detent bodies 25 and the inner synchronizing ring 21 are moved to the left in FIG. 1, the right-hand annular spring 32 is brought into engagement with the synchronizing muff 14 and its further displacement is inhibited. At continued axial displacement of the detent bodies 25, the bottom plate 28 formed as a spring seating will glide relative the spring 32 which, as a result of the conical form of the engagement surface 29, results in a further tensioning of the spring 32. The bottom plates 26, and thus the inner synchronizing ring 21 also, will therefore be acted on by an equalizing force striving to axially center the synchronizing ring 21 relative the synchronizing muff 14. This is advantageous when the synchronizing mechanism is in a disengaged state, since it ensures that the friction surfaces 12,22 of the synchronizing rings 7,21 do not engage against each other and thus cause friction losses. At the same time, it is also possible to reduce the necessary play between the friction surfaces 12,22 in a disengaged state, which means that the synchronizing mechanism can be given a correspondingly shorter implementation.

Within the scope of the following claims, the invention may be modified and formed differently than has been exemplified in the above description. Accordingly, synchronizing means can to advantage be arranged on both sides of a common synchronizing muff 14, i.e. a further gear can be arranged to the right of the muff 14 in FIG. 1.

In such a case, the synchronizing muff 14 is formed with further recesses to which abutments from a synchronizing ring are adapted in a corresponding manner to what has been described above. Annular springs 31,32, synchronizing muff 14 and connection sleeve 36 are thus common for both synchronizing means, which decreases the space requirement and permits small dimensions in such gearboxes.

I claim:

1. A synchronizing mechanism in a gearbox, preferably a vehicle gearbox, including a synchronizing muff (14) rotationally fixed to a shaft (1) and having external engagement teeth (34) coacting with internal engagement teeth (35) on an engagement sleeve (36) surrounding the synchronizing muff (14), this sleeve being axially displaceable for engaging engagement teeth (11) on a first synchronizing ring (7) rotatably mounted on the shaft (1) and unrotatably joined to a gear (6) and formed with a conical friction surface (12) for coaction with a complementary conical friction surface (22) on a second synchronizing ring (21) for synchronizing the rotation of the gear (6) and the shaft (1), the periphery of the synchronizing muff (14) being formed with a number of radial recesses (17) in which radial locating abutments (23) on the second synchronizing ring (21) engage, characterized in that each abutment is formed with a radial hole (24) in which a detent body (25) is displaceably mounted and adapted for being brought by spring means (31,32) into coaction with an interior annular groove (37) in the engagement sleeve (36), the second synchronizing ring (21) being axially centered relative the synchronizing muff (14) by the detent bodies and the spring means (31,32).

2. A synchronizing mechanism as claimed in claim 1, characterized in that each detent body (25) is formed with a bottom plate (26) axially formed with bevelled end planes (27) and in a transverse direction acting as spring seatings (28) for the spring means (31,32) acting against the detent body (25).

3. A synchronizing mechanism as claimed in claim 2, characterized in that the spring means (31,32) are two annular springs, located axially on either side of the detent bodies (25) urging them radially outwards.

4. A synchronizing mechanism as claimed in claim 3, characterized in that the bottom plates (26) formed as spring seatings on the detent bodies (25) are formed with engagement surfaces (29), for the spring means (31,32), that are undercut relative the respective center lines of the detent bodies (25).

5. A synchronizing mechanism as claimed in claim 1, characterized in that each recess (17) in the synchronizing muff (14) is formed with radially directed side surfaces (18) which, by inwardly sloping edge surfaces (19), merge into a centrally situated narrower bottom recess (20) in which the detent body (25) can be accommodated on disengagement from the engagement sleeve (36).

6. A synchronizing mechanism as claimed in claim 5, characterized in that in the engaged state for the detent bodies (25) in the engagement sleeve (36), each recess (17) allows turning of the synchronizing muff (14) relative the second synchronizing ring (21), said turning being limited by the locating abutments (23) on the second synchronizing ring (21) pressing against the edge surfaces (18,19) in the recesses (17), thereby locking the detent bodies (25) in said state of engagement.

* * * * *